United States Patent
Gross

(10) Patent No.: US 6,464,907 B2
(45) Date of Patent: Oct. 15, 2002

(54) METHOD FOR PRODUCING A BLOW MOLDED PLASTIC OUTDOOR BOOT SHELL

(75) Inventor: Alexander L. Gross, Aspen, CO (US)

(73) Assignee: Wisconsin Alumni Research Foundation, Madison, WI (US)

( * ) Notice: Subject to any disclaimer, the term of this patent is extended or adjusted under 35 U.S.C. 154(b) by 0 days.

(21) Appl. No.: 09/755,943

(22) Filed: Jan. 5, 2001

(65) Prior Publication Data

US 2001/0016992 A1 Aug. 30, 2001

Related U.S. Application Data

(63) Continuation of application No. 09/241,650, filed on Feb. 1, 1999, now abandoned.

(51) Int. Cl.$^7$ ............................ C09K 11/00; B29C 49/22
(52) U.S. Cl. ......................... 264/21; 264/515; 264/516; 264/535; 264/536; 264/540; 264/541
(58) Field of Search .................... 264/21, 515, 516, 264/535, 536, 540, 541, 161

(56) References Cited

U.S. PATENT DOCUMENTS

| | | | |
|---|---|---|---|
| 3,718,994 A | | 3/1973 | Spier |
| 3,872,202 A | * | 3/1975 | Lafosse ........................ 264/89 |
| 4,034,431 A | | 7/1977 | Fukuoka |
| 4,143,474 A | | 3/1979 | Blanc |
| 4,224,708 A | | 9/1980 | Becka |
| 4,253,251 A | | 3/1981 | Salomon |
| 4,255,825 A | | 3/1981 | Rigon |
| 4,266,314 A | | 5/1981 | Londner espouse Ours |
| 4,266,750 A | | 5/1981 | Gallizia |
| 4,279,044 A | | 7/1981 | Douglas |
| 4,286,936 A | | 9/1981 | Hustedt |
| 4,301,564 A | | 11/1981 | Dalebout |
| 4,302,889 A | | 12/1981 | Negrin |
| 4,562,834 A | | 1/1986 | Bates et al. |
| 4,654,985 A | | 4/1987 | Chalmers |
| 4,722,131 A | * | 2/1988 | Huang ........................ 29/450 |
| 4,919,855 A | * | 4/1990 | Thomas ....................... 264/21 |
| 5,014,449 A | | 5/1991 | Richard et al. |
| 5,575,091 A | | 11/1996 | Mattiuzzo |
| 5,647,150 A | | 7/1997 | Romanato et al. |
| 5,693,270 A | * | 12/1997 | Moore et al. ................. 264/21 |
| 5,822,889 A | | 10/1998 | Ueda |

* cited by examiner

Primary Examiner—Suzanne E. McDowell
(74) Attorney, Agent, or Firm—Foley & Lardner

(57) ABSTRACT

A boot comprising an upper portion, an outersole portion, an optional midsole/wedge portion and a shell portion, wherein the shell portion is produced by the blow molding process. The shell portion may contain a midsole/wedge element inside or outside of its volumetric shape and it may also contain a pre-molded outersole which is replaced into the blow mold. The shell portion can be produced with thickness as little as 0.25 mm and weight as low as 25 grams. The shell portion may be constructed of any material that is extrudable. The shell portion is produced with mold cavities, but no mold core. The shell portion may be flocked internally with textile fibers. A pair of shell portions can be simultaneously produced from a single extrusion of material.

18 Claims, 22 Drawing Sheets

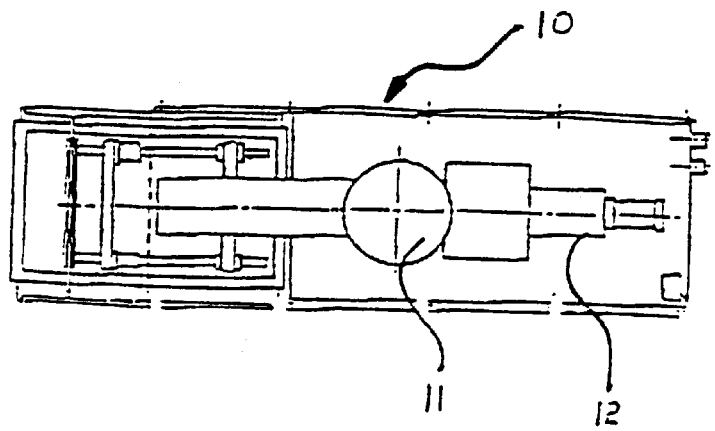
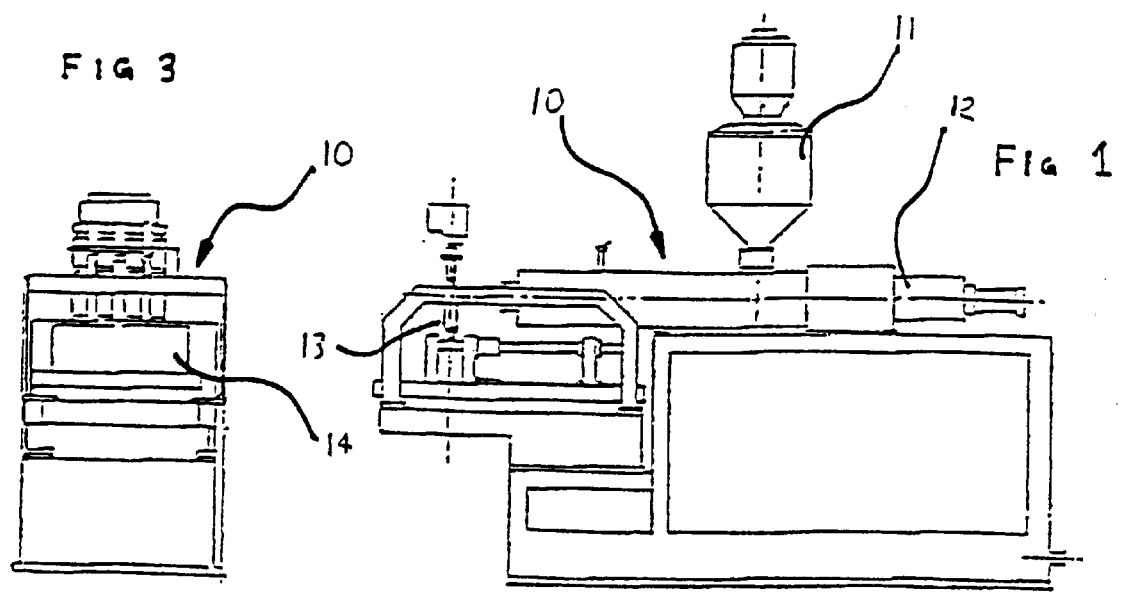

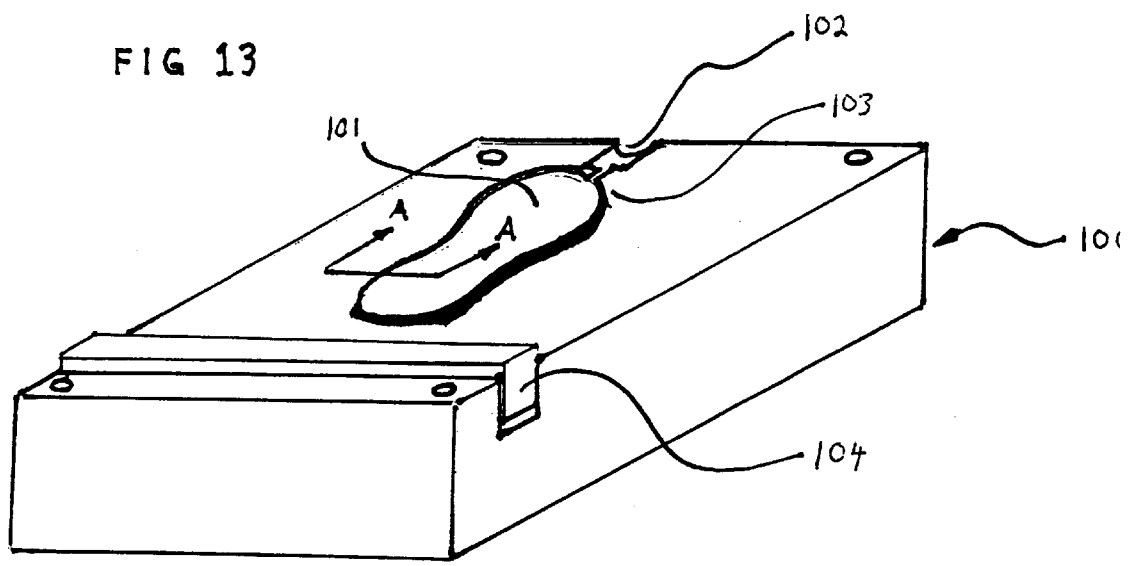
FIG 13
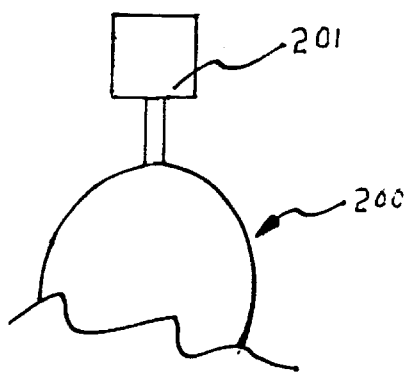
FIG 14
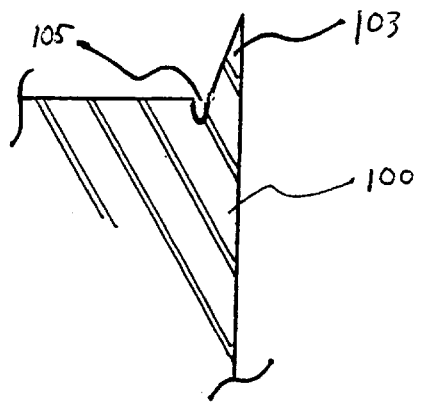
FIG 15 sec A-A

FIG 16
FIG 17
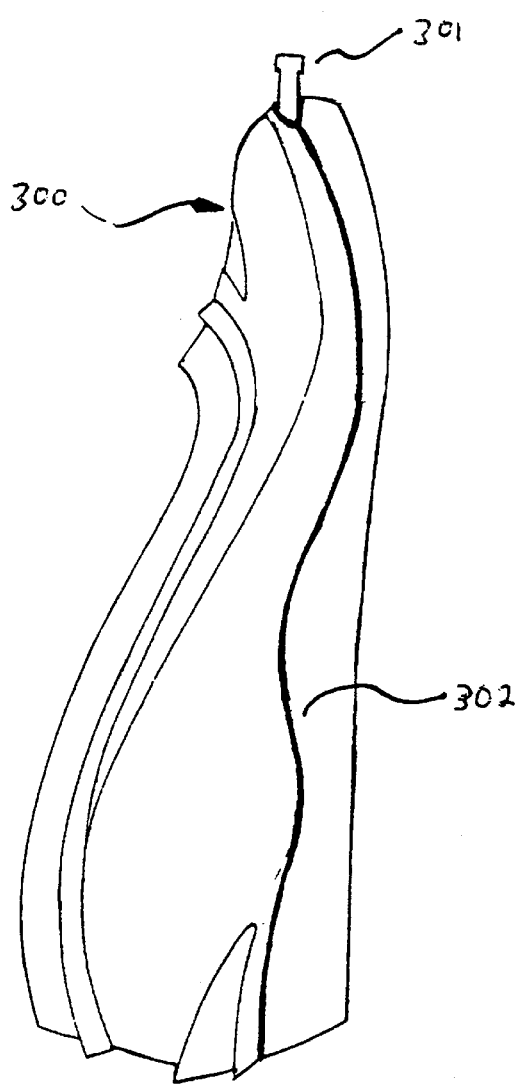
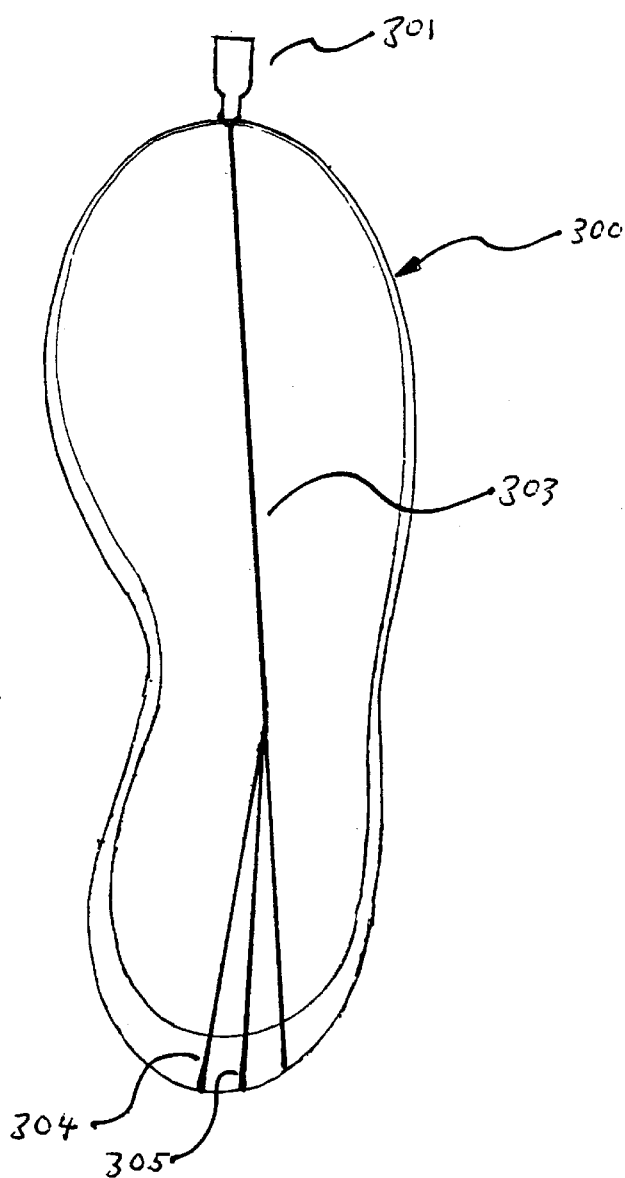

700

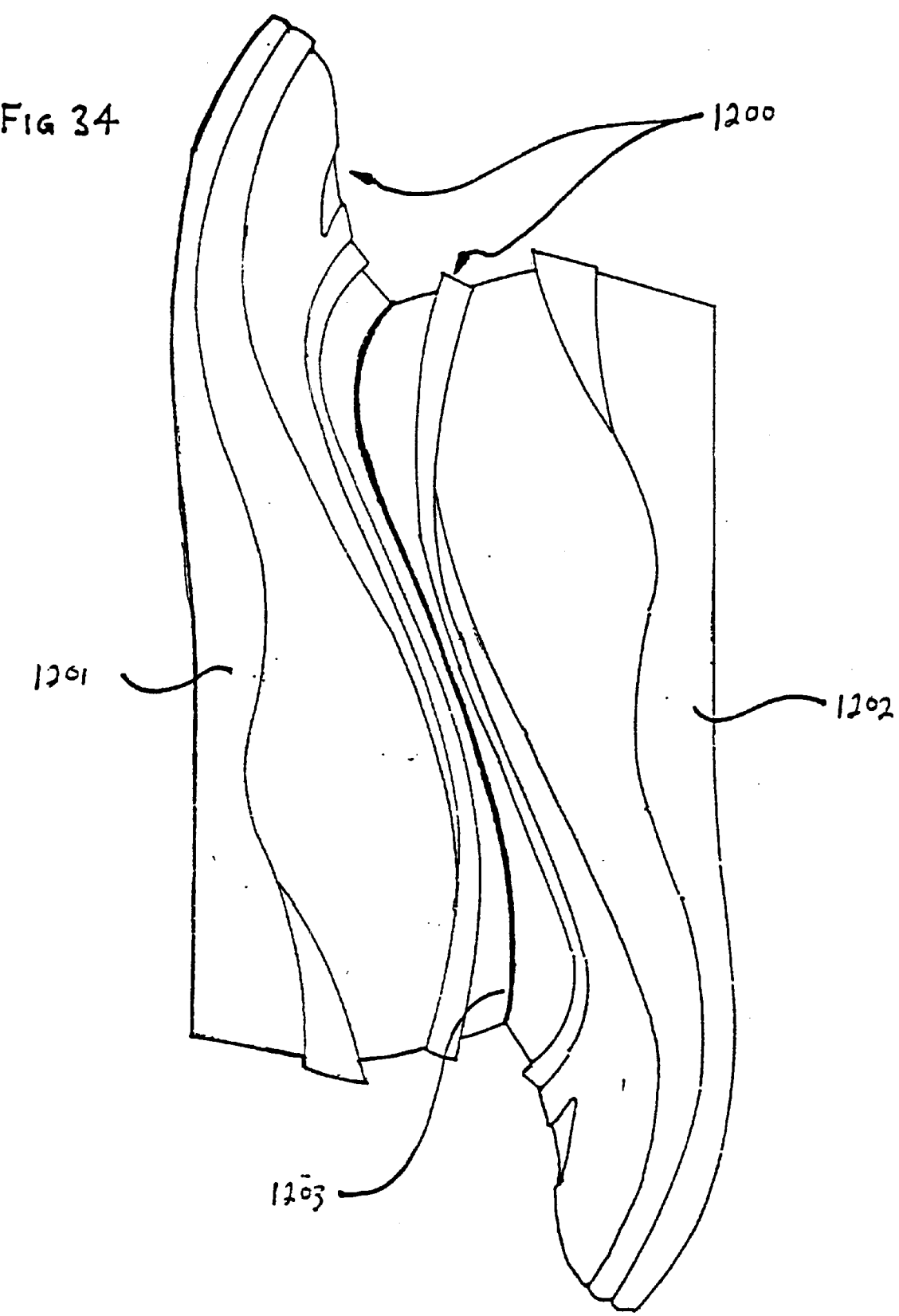

METHOD FOR PRODUCING A BLOW MOLDED PLASTIC OUTDOOR BOOT SHELL

This application is a continuation of U.S. application Ser. No. 09/241,650 filed on Feb. 1, 1999, now abandoned.

BACKGROUND OF THE INVENTION

1. Field of the Invention

The present invention relates to protective boots, and particular, to boots constructed for environmental protection and outdoor winter sports usage. The invention is intended to greatly reduce the weight to enhance winter athletic performance at greatly reduced cost.

2. Prior Art

The modern winter boot, particularly those used for hunting, ice fishing, snow shoeing, winter hiking, snow boarding, skiing, dog sledding, in-line skating and serious climbing are made up of a combination of many elements that have specific functions, all of which must work together for the support and protection of the foot. Winter sport boots today are varied in both design and purpose. Ski boots, Snowboard boots, winter hikers, snow shoeing boots, hunting boots, ice fishing boots, dog sledding boots, etc. all are designed to be used in very specific, and very different ways. They are also designed to provide a unique and specific combination of traction, warmth, water proofness, support and environmental protection to enhance performance. Not only are boots designed for specific sports, they are also designed to meet the specific characteristics of the user. For example, boots are designed differently for heavy duty usages than for light duty usages. The sport of skiing, versus ice fishing, impose totally different structural loads on the boot shell construction. It is therefore important to be able to adjust the characteristics of the various possible structural shell designs of the boot to accommodate these factors. It is also desirable to be able to minimize the weight of such structural shell designs so as to enhance outdoor winter performance (as well as summer usages.)

Generally, a protective boot is divided into 3 or 4 parts; the traction system, the shell, the upper, and the insulation or liner system (if applicable.) The traction system is generally natural rubber or a variety of synthetics (such as polyurethane) or co-polymers of both natural and synthetic elastomers. The insulation (if applicable) is produced as a "hung lining" inside the upper and shell, or consists of a removable liner or "bootie." The "upper" may be of leather or synthetic materials (in the case of "Pac Boots") or plastic (in the case of a Ski Boot "Cuff".) Various upper constructions are possible, and in use at this time.

It is the shell, that we are most interested in exploring herein. Basically, five different types of shells exist today; an injection molded plastic shell (ski boots, in-line skates, serious climbing boots, etc.) an injection molded rubber (or synthetic) shell (pac boots, cycling boots, etc.), a vulcanized rubber shell (pac boots, waders, etc.), dipped rubber (or synthetic) shell footwear (ice fishing, waders), and injected polyurethane foam shell footwear (pac boots, etc.) Centrifugally molded footwear is scarce to non-existent in today's marketplace.

The function of the shell is the most crucial of all of the components that make up protective boots, particularly for outdoor sports usage. For ice fishing, the shell must be wind proof and waterproof. For skiing, the shell must be wind proof, water/snow proof, and also highly structural (stiff.) Abrasion and cut/tear resistance is also important Sunlight/ UV protection and chemical resistance must be also considered. Cold crack flexibility and heat resistance are also required.

The integration of the shell to the other components of the boot (upper, midsole—if applicable and outersole) are also key considerations. For example, Pac Boots require that the shell contain a stitch flange (for sewing through) to enable attachment of the upper. Ski boots require that the shell be able to anchor and secure rivets for attachment of the (ankle) cuff. In-line skates require the same, of their shell. Bonding is also required for attachment of uppers as well as outersoles, Some pac boots incorporate "textile fibre knit socks" attached to the inside surface to reduce the surface friction within the shell assembly.

To achieve adequate shell functionality, as well as integration into the various end usages of the completed boots, is a daunting task. There are many limiting factors faced by today's designer. Among them are the following process limitations (with all currently used processes:)

Injection Molding

1. The thickness of the shell is too great at all of the "minimum desired thickness" areas (most of the whole shell.)
2. The shell is too heavy to achieve enough weight reduction for highly active sports usage.
3. The costs of finished parts as well as molds is very very high.
4. Mold series production time is too long.

Vacuum Forming

1. The shell must be produced in two parts, rather than one.
2. Thermoplastic welding is required to integrate the shell halves.
3. Weld reliability is always suspect, especially for cold weather impact and flexibility requirements.
4. Very few available materials exist in sheet form, for this process.
5. Parts are too expensive.

Centrifugal (Rotational) Molding

1. All corners of parts are too thick, due to process.
2. Pars are too heavy, due to above.
3. Parts are too expensive.

RF (FLOW) MOLDING

1. Deep 3D shape of parts is not achievable at all.
2. Proper materials are not sensitive to RF.

Injection molded boot shells are well known to the art. For example, U.S. Pat. No. 4,253,251, to Salomon, describes a rigid shelled ski boot containing an internal foot restraint system. The shell itself is too thick, too heavy, and too expensive for any sport except skiing. U.S. Pat. No. 4,279,044, to Colquaud, describes a polyurethane molding process which involves a 3 step "insert molding" process for sandals. This process cannot produce truly functional cold weather outdoor boot shells.

U.S. Pat. No. 5,647,150, to Romanato et al., describes an injection molding process for footwear shells, whereby a fabric sock becomes molded to the inside surface of the boot shell. Again, since the shell is injection molded, it is too thick, too stiff, and too expensive for anything but alpine ski boot usage. Additionally, U.S. Pat. No. 5,575,091, to Mattiuzzo, describes another injection molded ski boot application, this time employing a boot cuff with a rigidizing insert. Once again, an ultra stiff, heavy, and expensive boot shell results. U.S. Pat. No. 4,266,750, to Gallizia, describes a process for producing elastomeric boot shells but not plastic. Three separate shells are molded together, via an internal expandable bladder. This process produces boots far too heavy and expensive, only from non-plastic (elastomeric material.)

Additional prior art references relevant to this invention are:

U.S. Pat. No. 4,255,825, to Rigon, describes another injection molding process for plastic boots with rigid high heels.

U.S. Pat. No. 4,302,889, to Negrin, describes a boot to be worn after skiing. The novel feature here, seems to be the internally suspended lining system, within a shell.

U.S. Pat. No. 4,286,936, to Hustedt, describes an injection casting apparatus for shoe soles only. This process cannot produce a completed boot shell.

U.S. Pat. No. 4,224,708, to Becka, describes a machine for molding and flanging only the uppers of shoes. Again, this machine cannot produce a completed boot shell.

U.S. Pat. No. 4,266,314, to Londner espouse Ours, describes a method of manufacture of sports shoes involving two overlapping portions of plastic material overmolded onto a lining material, formed into the shape of a slipper. Adding a sole comprises a third step of this operation. This invention is far to labor intensive to be competitive in today's markets.

Furthermore, U.S. Pat. No. 4,301,564, to Dalebout, describes a novel method for producing inner boots that fit within an outer shell, but falls short of defining a process which produces the shell itself.

OBJECTS AND SUMMARY OF THE INVENTION

It is an object of this invention to provide a method for producing outdoor boot shells that can be as thin as 0.25 mm. Currently, no other method can produce them less than 1.0 mm thick on a consistent basis. In most cases, 1.5–2.0 mm is un-achievable.

It is a further object of this invention to provide a method for producing outdoor boot shells that can weight as little as 40 grams. Currently, no other method can produce them less than 100–140 grams.

It is a further object of this invention to provide a method for producing outdoor boot shells that cost ½ (half) the cost of any other process.

It is still a further object of this invention to provide a method for producing the molds for the boot shells at a quicker rate, as well as a lower cost.

The foregoing primary objects of this invention are achieved by producing a coreless mold consisting only of mold cavities (no cores.) Two or more cavity sections may be used. The mold sections are also provided with an opening for the insertion of gas pressure. The mold sections are further provided with a spring loaded set of pinch bars. The mold sections are still further provided with a circumferential "pinch-off die edge," located around (at) the parting line of the mold sections.

Additionally, the primary objects of this invention are achieved by positioning the above mold in such a way(s) that it can receive an extruded thermoplastic or thermoset parison (cylinder shaped length) of extruded material and incorporate a pressurization attachment, so as to allow inflation of the parison so as to fill out the mold cavity shape. Once the part is cool, it can be ejected and trimmed.

A preference of this invention is to employ an extrusion source that can be computer controlled so as to be able to vary the parison thickness across its length (circumferential bands.)

A further preference of this invention is to employ extrusion die head tooling that allows "striping" (vertical bands) so as to be able to vary the thickness of the parison along its length also.

An objective of this invention is to allow quicker processing times (in the mold) for each boot shell. This is achieved since the thinner material allowed by the process can be cooled much quicker (and with less shrinkage, as well) than the thicker parts produced by other processes.

A still additional object of this invention is to be able to over-mold inserts which are pre-placed inside of the mold, prior to capturing the parison within the mold. These inserts may consist of rubber tread elements of the outersole, rigidizing stiffeners at selected locations, or decorative elements, etc.

A still further additional object of this invention is to be able to simultaneously mold a pair (left and right) of boots from the same parison, using only one mold in which to do it. This is accomplished by using a larger diameter parison (than required for producing only one boot.) Also, the single mold utilized employs cavities for both left and right boot shells. The cavities are joined at the entry hole (for the foot) at the top of each boot. The pair is molded in one shot and separated into a left and right boot via a single trim line which connects the pair of boots during the molding process only.

Additionally, an object of this invention is to provide a boot shell that can employ a textile fiber covered inside surface in order to control the surface friction inside of the shell. This is accomplished by a secondary process called "flocking." Flocking of the inside surface requires a special adhesive and conductive grounding system for the cement laden inside surface of the boot shell, which is pre-sprayed before the ground textile fibers ("Flock") is introduced, Both adhesive and flock are introduced through the "blow hole" of the shell which is automatically present, due to the blow molding process utilized here. An electrostatic spray gun is used to introduce the flock into the boot shell, before the boot shell foot opening is trimmed off.

A final objective of this invention is to be able to eliminate the high cost of excess material which is trimmed from the part after molding (flashing.) As an example, in the injection molding process, only a small portion of the flashing can be reground and reused. Typically a maximum of 5% of the reground material is usable, without adversely affecting the properties of the virgin material which it is added to.

This objective was attained by reducing the shear forces, experienced by the material during extrusion and molding processes to the point that—if the material is not scorched (over heated)—the flashing can be trimmed off, reground, and mixed into virgin material at a 100% regrind rate. This is not possible in any other process.

A further objective of this invention is to produce a boot shell which may employ either an internal or an external midsole/wedge material in order to provide heel lift for the foot, both internally and externally (to the shell) or either/or.

The foregoing and other objects, features, and advantages of this invention will be apparent from the following description of the preferred embodiments of the invention as illustrated in the accompanying drawings.

BRIEF DESCRIPTION OF THE DRAWINGS

The following is a brief description of each of the figures herein:

FIG. 1 is a side plan view of a blow molding machine. Hopper, extruder, and die head are visible.

FIG. 2 is a top plan view of a blow molding machine. Extruder and hopper are visible.

FIG. 3 is a front plan view of a blow molding machine. Mold platen is visible.

FIG. 13 is a frontal/top perspective view of one of the two mold cavity halves for a typical boot shell. Blow pin hole, pinch off ridge (circumferential around cavity,) and spring loaded pinch bars are all visible.

FIG. 14 is a top plan view depicting the blow pin plastic flashing left attached to the toe of the boot shell. The mold is removed.

FIG. 15 is a transverse cross-sectional view of the mold pinch-off ridge which seals off the mold cavity when the mold is closed.

FIG. 16 is a side plan view of the boot shell with the blow hole plastic flashing still attached to the part. The dark line shown is one of many possible mold parting (open/close) lines.

FIG. 17 is a bottom plan view of the boot shell showing 3 possible parting lines, as depicted by the dark lines on the shell bottom. Only one of these 3 lines would be used for a given mold.

FIG. 34 is a plan view showing a left and right boot shell blow molded as a single assembly from a single parison. The dark trim line separates the shells as a secondary operation.

DETAILED DESCRIPTION OF THE INVENTION

Figure 4:
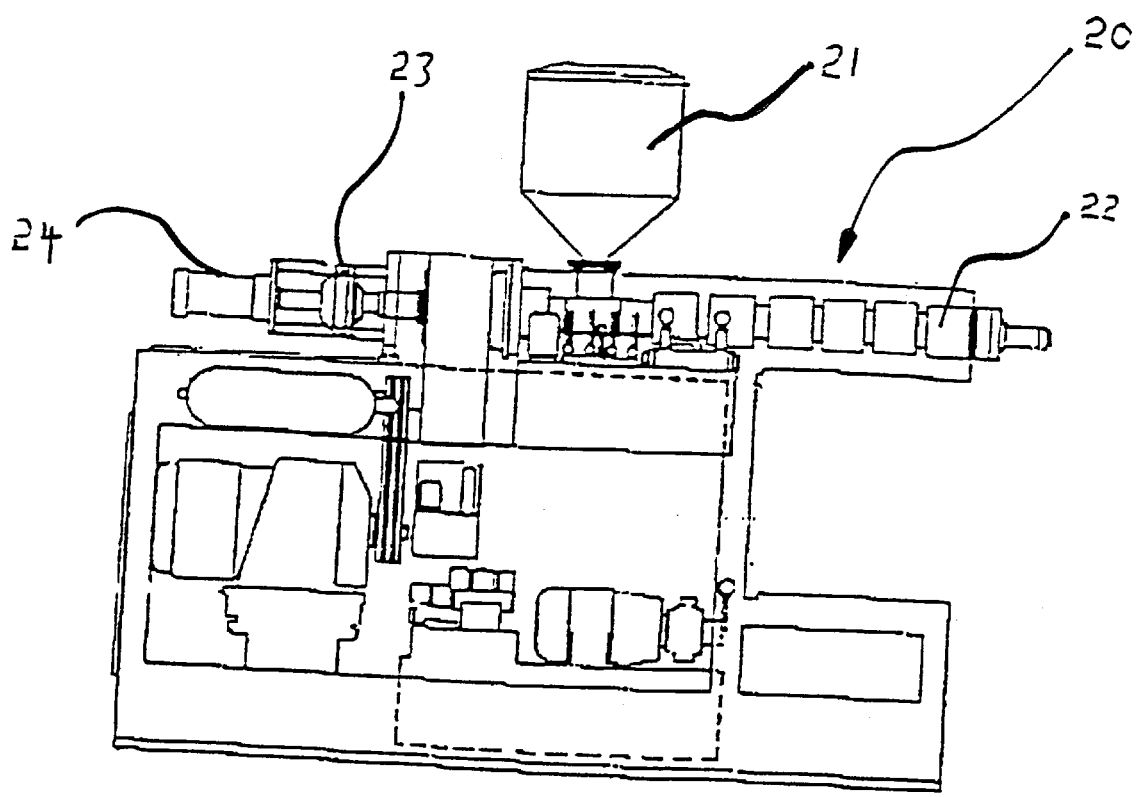
FIG. 4 is a side plan view of the extruder unit.

Referring to the drawings, wherein like numerals indicate like elements, an article of footwear, such as an outdoor winter boot, is depicted in accordance with the present invention. Generally, the boot comprises a shell structure or member and an upper attached thereto. The upper can be of any conventional design, while the shell structure (method of producing same) incorporates the novel features of the present invention. The shell structure includes a plastic shell, midsole/wedge (if applicable,) and an outersole (if applicable.)

Referring to FIGS. 1, 2 and 3, and very generally speaking, a blow molding machine, shown generally at 10, consists of a hopper 11, which thermoplastic/thermoset material is fed into. The barrel and screw assembly 12, advances the material to the die head tool 13, which extrudes a parison into the mold for the boot shell at location 14.

Referring to FIG. 4, and extruder 20, incorporates a barrel and screw assembly 22, which pushes the molten plastic, received from hopper 21, toward the shot cylinder 24, passing thru the metering process and thrust bearing 23.

Figure 5:
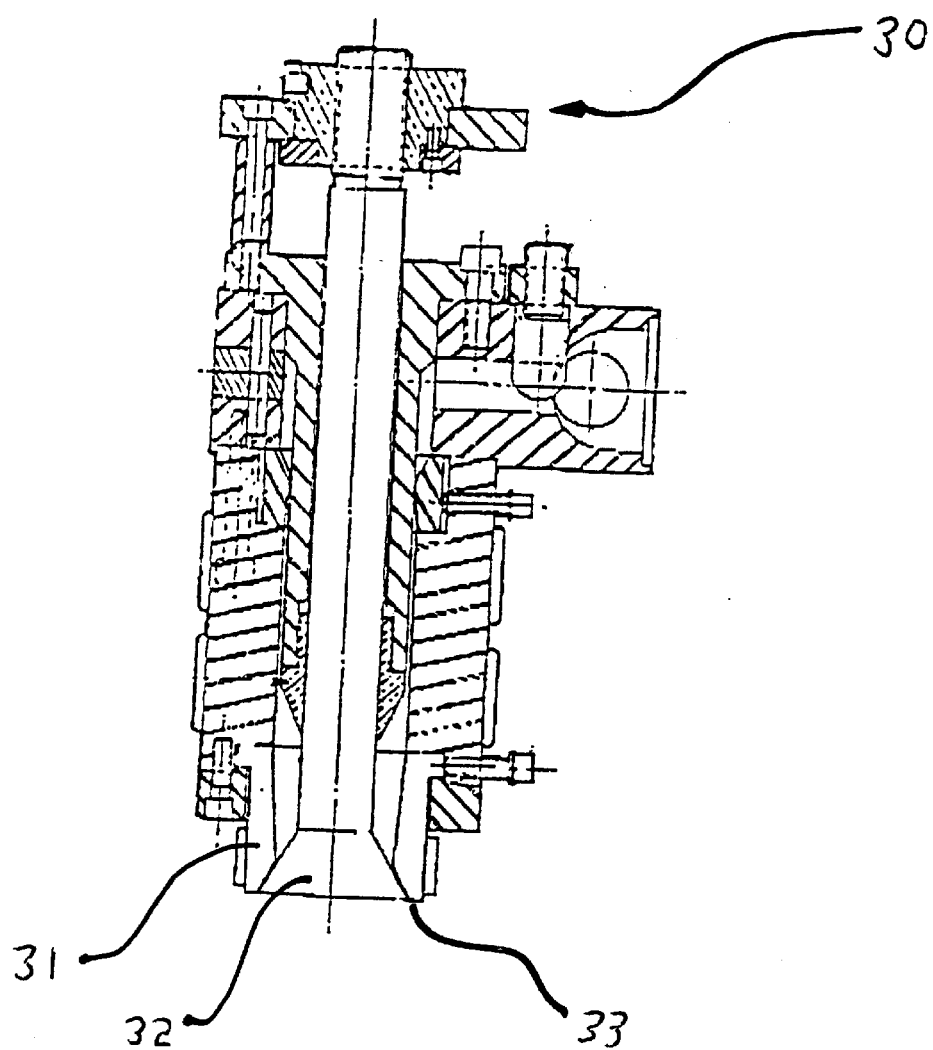
FIG. 5 is a cross-sectional side plan view of the extrusion die.

Referring to FIG. 5, the die head or extrusion manifold 30, incorporates a die 31, which interfaces with a mandrel 32, so as to create an opening for plastic material to flow through (die gap) 33.

Figure 6:
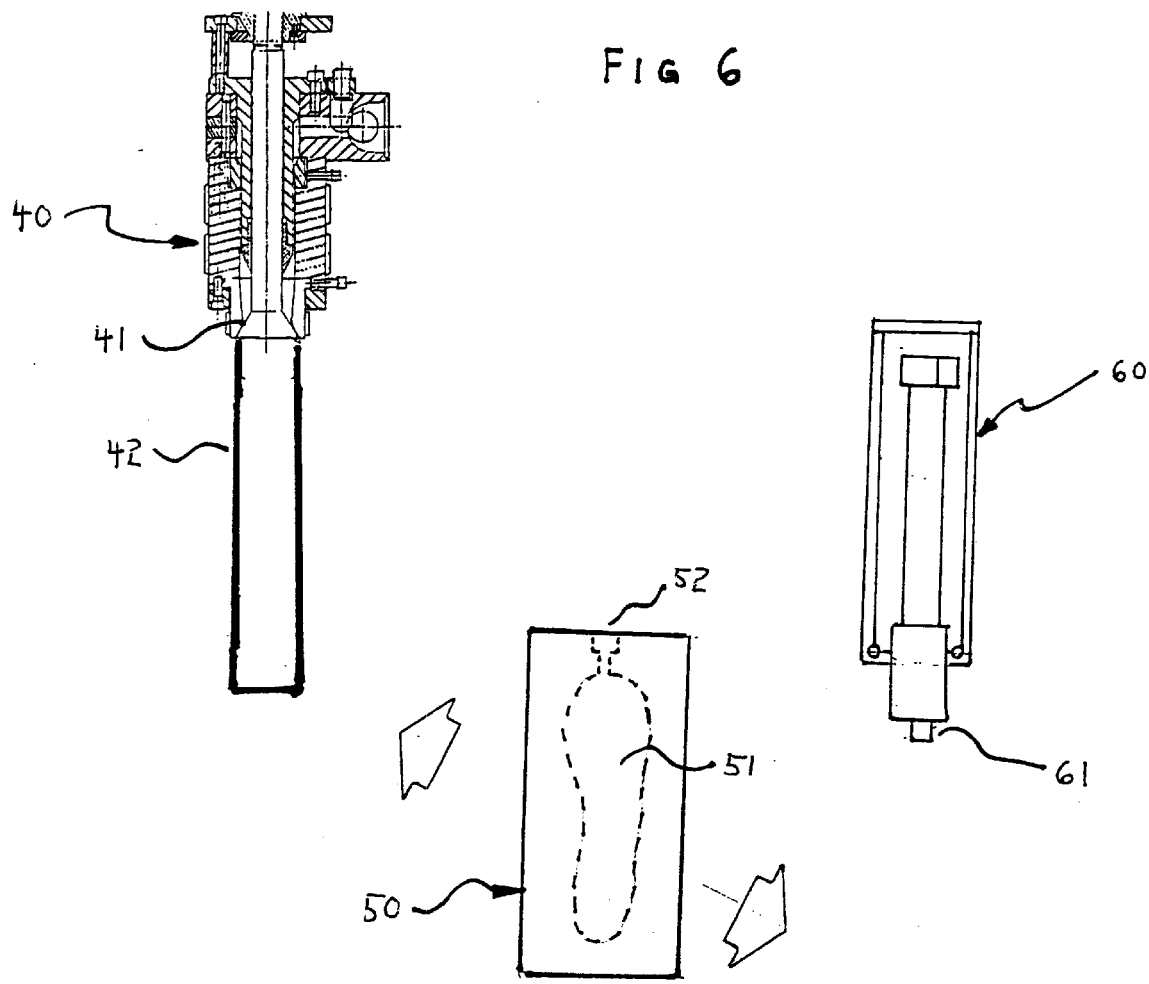
FIG. 6 is a cross-sectional side plan view of the extruder head emitting a parison. Shown on the right side is a front plan view of a typical blow (pressure) unit. Shown in the center is a side plan view of a blow mold for a boot shell. In this set-up, the mold shuttles between the die head tool of the extruder and the blow unit.

Referring to FIG. 6, the die head tool 40, with die gap opening 41, allows a thin walled parison 42, to be extruded and to hang freely, awaiting pick up and capture by shuttle type boot shell mold 50. Mold 50, incorporates a boot shaped cavity 51, and a blow pin receptacle 52. Once the parison 42, is captured by the shuttle mold 50, the shuttle mold 50, then moves over to the s id e mounted blow unit 60, which incorporates blow pin 61. Once the interface is complete, blow unit 60, pressurizes the plastic parison 42, trapped within the mold cavity 51 of shuffle mold 50, via the interface of blow pin 61, with its blow pin receptacle 52.

Figure 7:
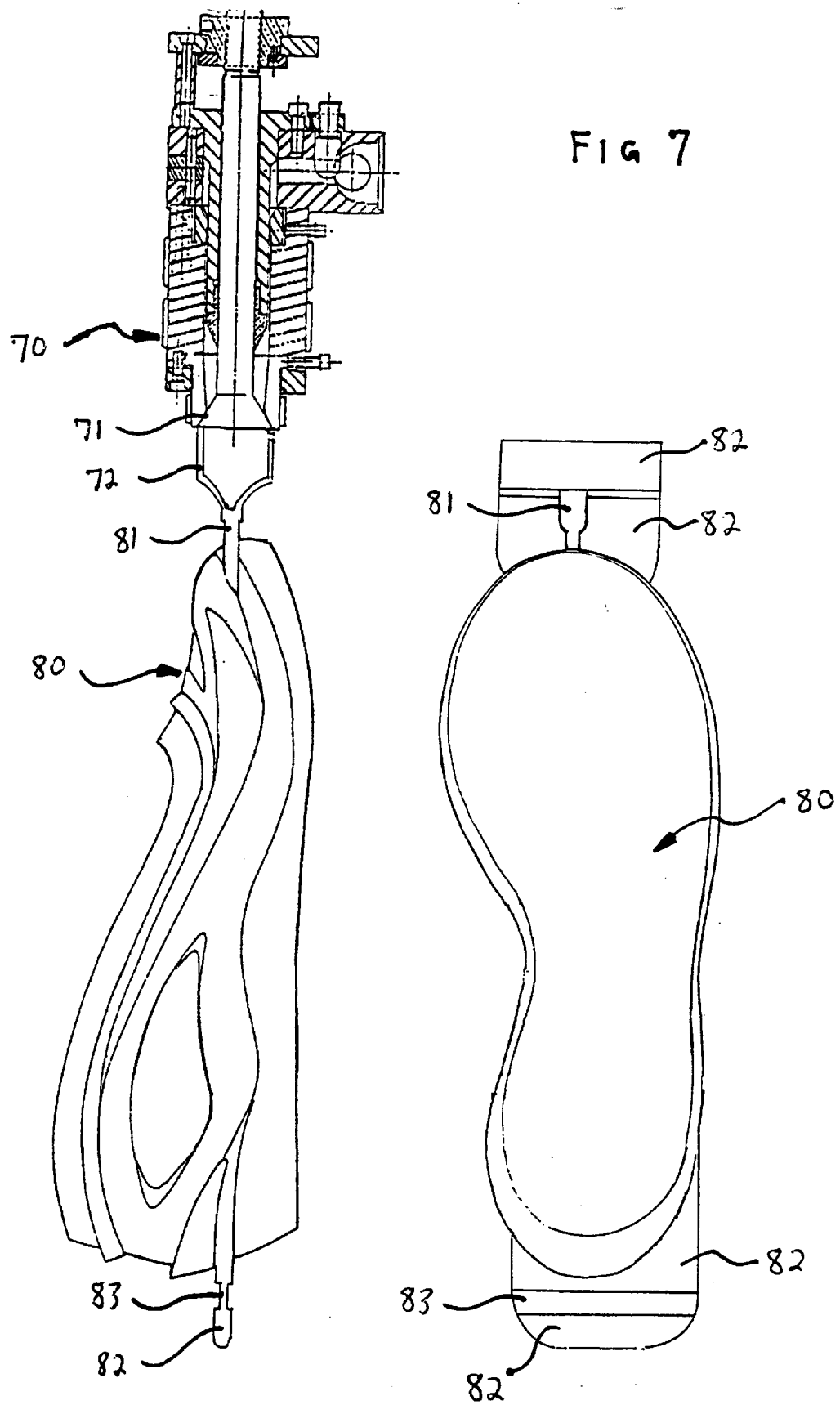
FIG. 7 is a side plan view of a boot shell still connected to the parison, with the mold not shown. A bottom plan view of the shell is also shown. All flashing is still on the part. The die head is shown in cross-section.

Referring to FIG. 7, the now extruded and blown parison 42, has formed boot shell 80, which is shown with shuttle mold 30, removed. The configuration shown here is different than FIG. 6. In this case the die head 70 incorporates an internal blow pin that engages the blow pin receptacle 52, to produce the blow pin funnel, 81. Notice the shape of the flashing 82 at the rear of boot shell, 80. Mold pinch bars, 104, of FIG. 13, pinch off the parison 72, at the rear of the boot shell, 80 (bottom of parison, 72,) so as to form recess, 83 which allows pressurization of the parison 72, within the boot shell mold, 52.

Figure 8:
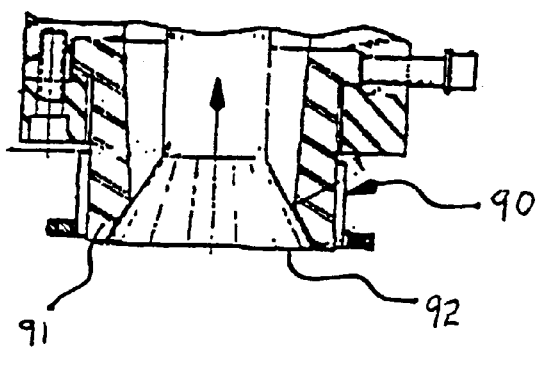
FIG. 8 shows a cross-sectional view of the die head with the central mandrel fully retracted (upward into the die assembly body.)
Figure 9:
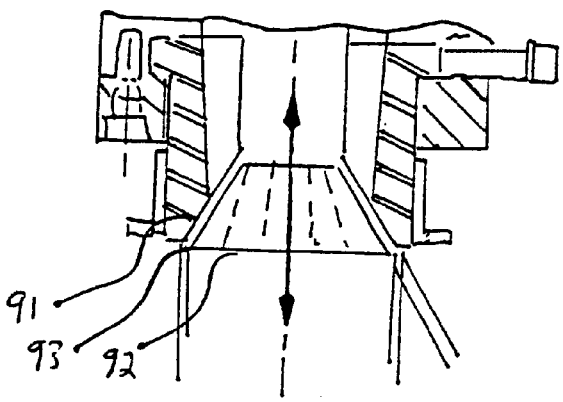
FIG. 9 is a cross-sectional plan view of the die head with the central mandrel in a downward (open) mode. In this mode, plastic is allowed to flow between the die and mandrel, thus forming a parison.
Figure 10:
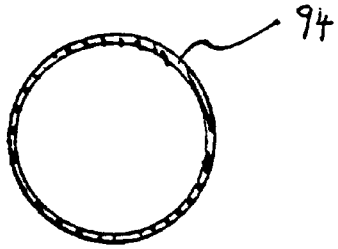
FIG. 10 shows a cross-sectional view, taken perpendicular to the parison length. It depicts a uniform thickness parison.

Referring to FIGS. 8, 9, and 10, the die head tool 90, incorporates die, 91, with internal mandrel, 92. As mandrel, 92 is caused to move up and down (by computer control,) die gap, 93 changes the thickness of parison, 72 in circumferential bands as indicated by parison, 94 of FIG. 10.

Figure 11:
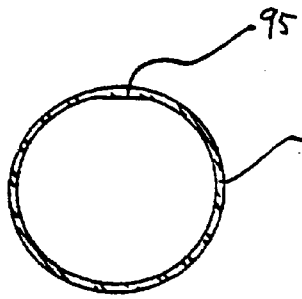
FIG. 11 shows the same parison, except with a stripe (flat spot) at the top only. This results in a vertical stripe of thicker material in this area only.
Figure 12:
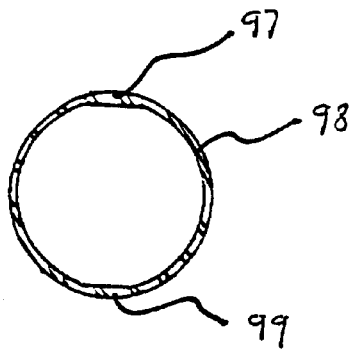
FIG. 12 shows the same parison, except with a pair of stripes at both the top and bottom. This results in a pair of vertical stripes of thicker material at these locations only.

Referring to FIGS. 11 and 12, parisons, 96 and 98 are thickened at selected areas only, 95 and 97/99. These slightly thickened areas, 95/97/99, are produced by removing material from the mandrel, 92. This process is called striping the die head tool. It produces vertical strips of thicker material, 95/97/99 along the length of parison, 72.

Referring to FIGS. 13, 14, and 15, boot shell mold, 100, incorporates boot shell cavity, 101, blow pin receptacle, 102, pinch-off ridge, 103 and spring loaded pinch bar(s), 104. Adjacent to, and outside of the pinch-off area, 103 is located recess, 105 which is designed to prevent excess flash material, 82 from not allowing the pinch-off ridge(s), 103 to proper affect mold closure and seal-off. A plastic funnel, 201 is formed at the toe area of boot shell, 200 by the blow pin receptacle, 102.

Figure 18:
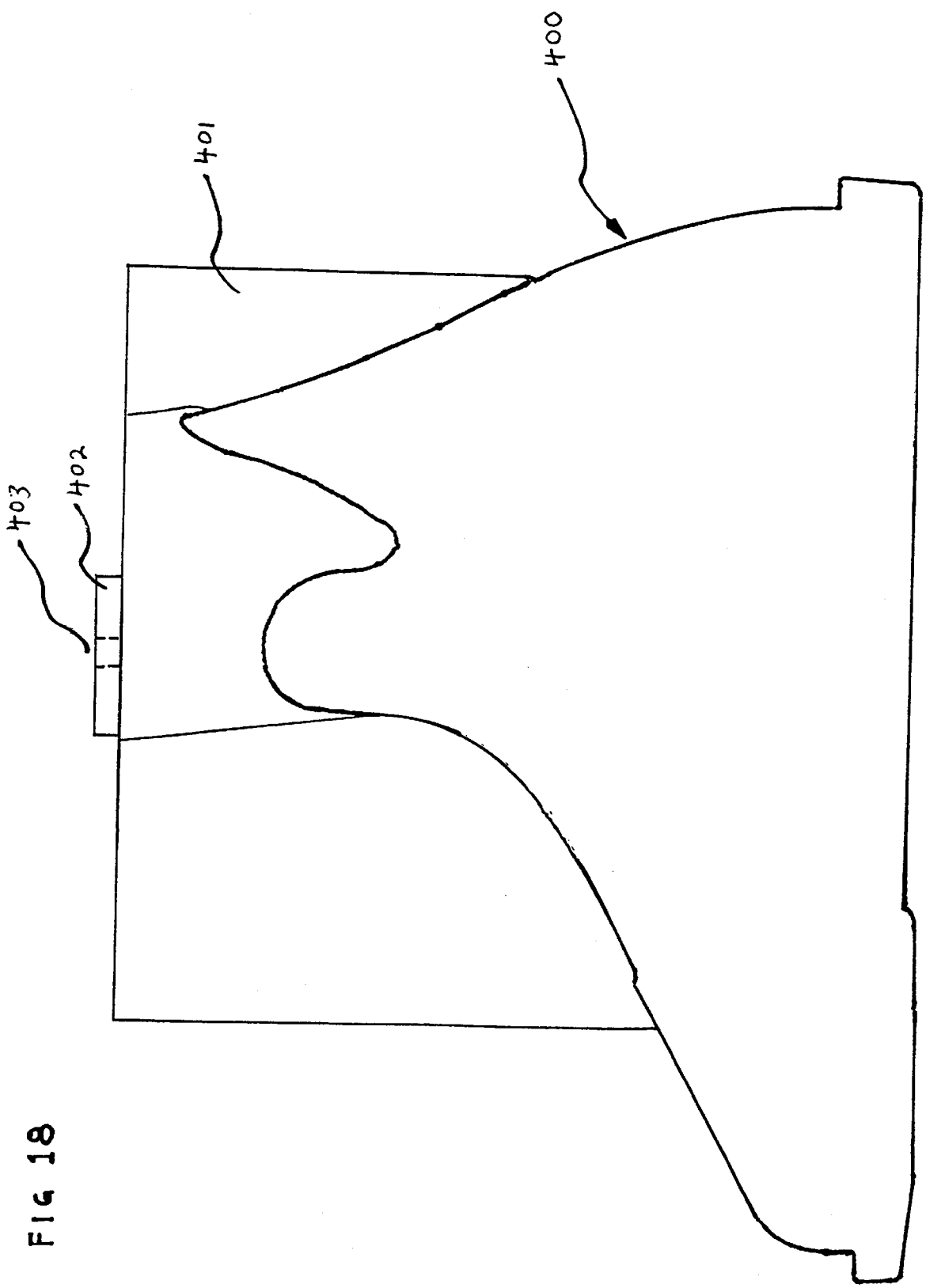
FIG. 18 is a side plan view of a ski boot shell with its very large parison still attached. The blow pin hole is visible, in dotted lines, at the top of the parison. The parting line, in this case, is the dark boot shell profile line shown (outline of boot.)
Figure 19:
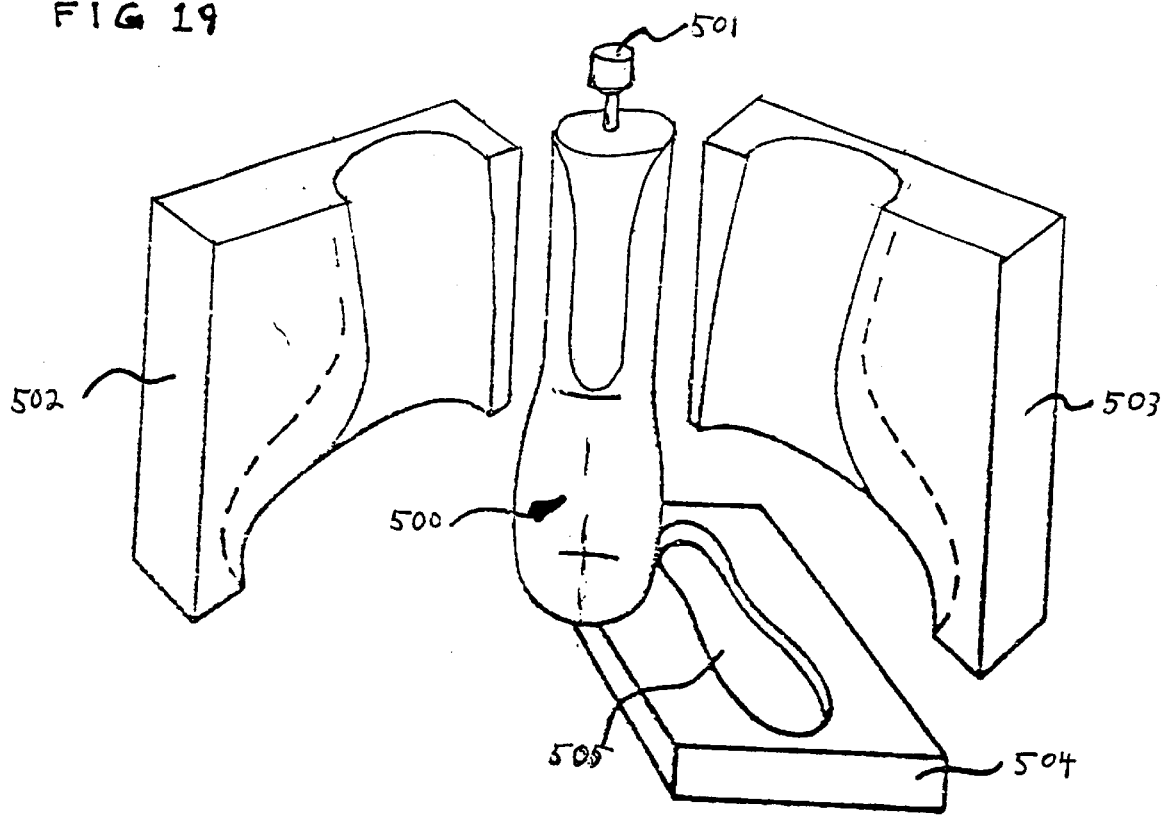
FIG. 19 is a frontal perspective view of a ski boot shell, with the 3 mold segments (cavities) that produced it shown in an exploded fully open view. In this case a separable sole plate was also used.

Referring to FIGS. 16 and 17, of boot shell, 300, mold parting line, 302 is formed by the pinch-off ridge(s), 103. This parting line exists in the transverse plane of the boot shell. Sagittal plane parting lines such as 303, 304, and 305 are also used. These parting line locations basically split the mold halves vertically down the approximate centerline of the boot shell. FIG. 18 shows this type of parting line location. In this case the mold cavities are oriented vertically so as to produce ski boot shell, 400. Also shown are blow pin funnel, 402/403 and flashing, 401. The type of mold which creates this type of parting line is shown in FIG. 19. The untrimmed ski boot shell, 500 with blow pin funnel, 501 is released from mold cavities, 502, 503, and 504 (if required.) Sole plate 504 may also hold inserts, such as an outersole, within its sole cavity, 505.

Figure 20:
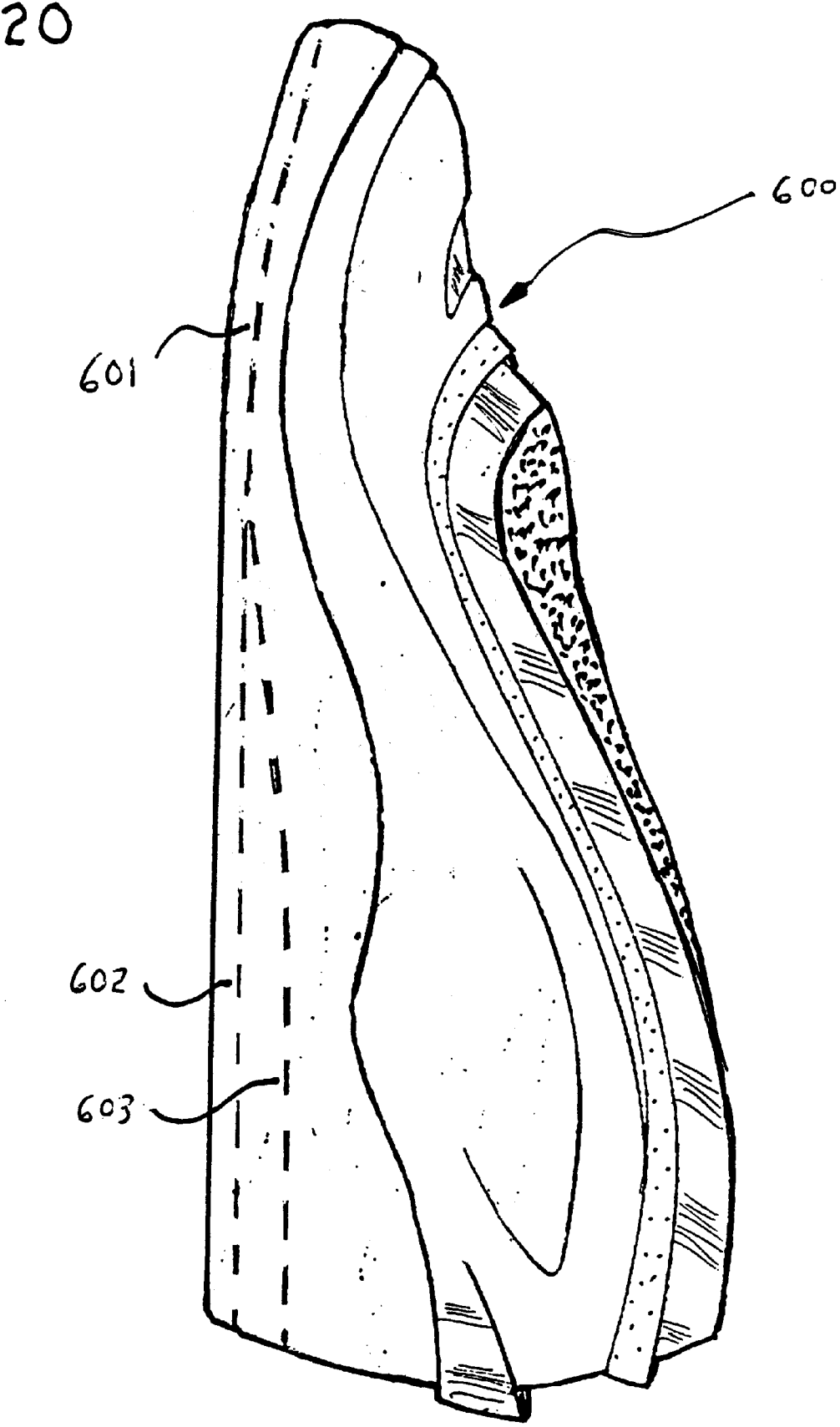
FIG. 20 is a side perspective view of a boot shell. The dotted lines indicate possible placement(s) for internal midsoles/wedges.

Referring to FIG. 20, boot shell, 600 incorporates internal midsole(s)/wedge(s) which are located within the shell at dotted line locations 601, 602, and/or 603. The properties of the internal componentry may vary, depending upon the type of boot which they are placed within. For example, ski boot shells employ a rigid insert, cold weather snow boots would employ either foam or an insulating felt material or both. A large variety of materials are available for various purposes.

Figure 21:
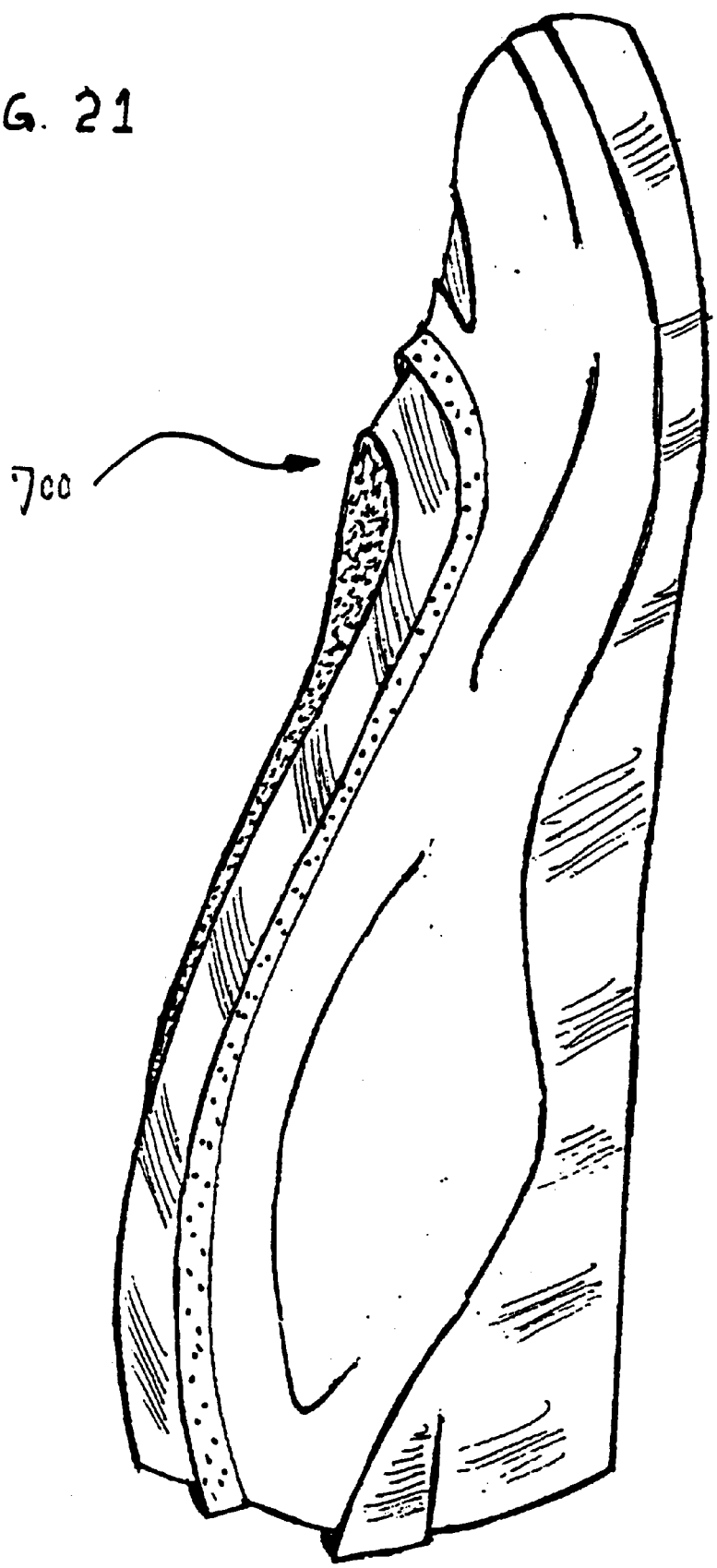
FIG. 21 is a side perspective view of a boot shell designed with no internal midsole/wedge. An external wedge/midsole would be used for this configuration.

Referring to FIG. 21, boot shell, 700 does not allow room for internal midsole(s) or wedge(s) This type of shell requires external componentry to provide the heel lift function, at a minimum.

Figure 22:
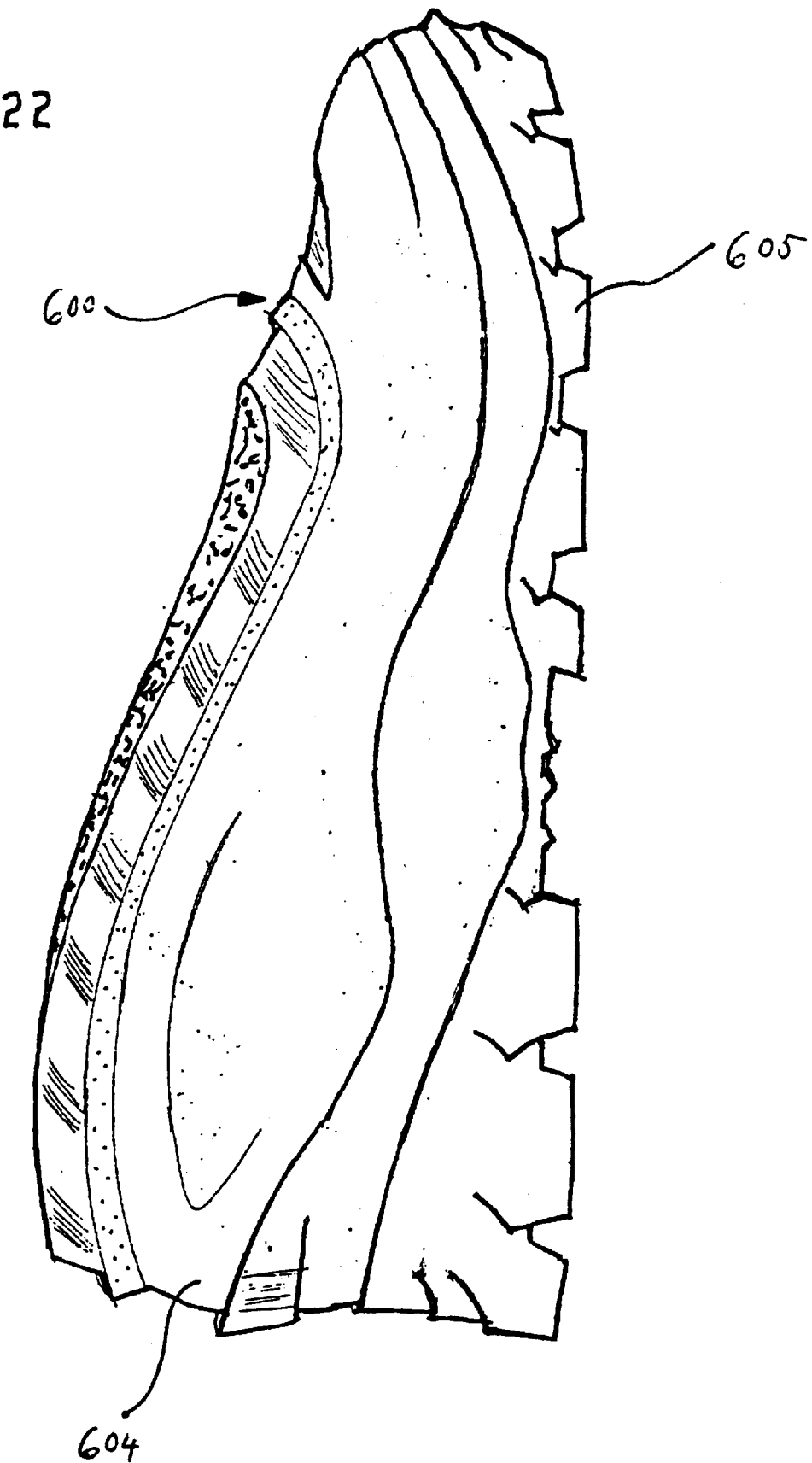
FIG. 22 is a side perspective view of the boot shell of FIG. 20 with an outersole attached at the bottom of the shell.

Referring to FIG. 22, boot shell 604 is placed within outersole, 605 to make up boot assembly, 600.

Figure 23:
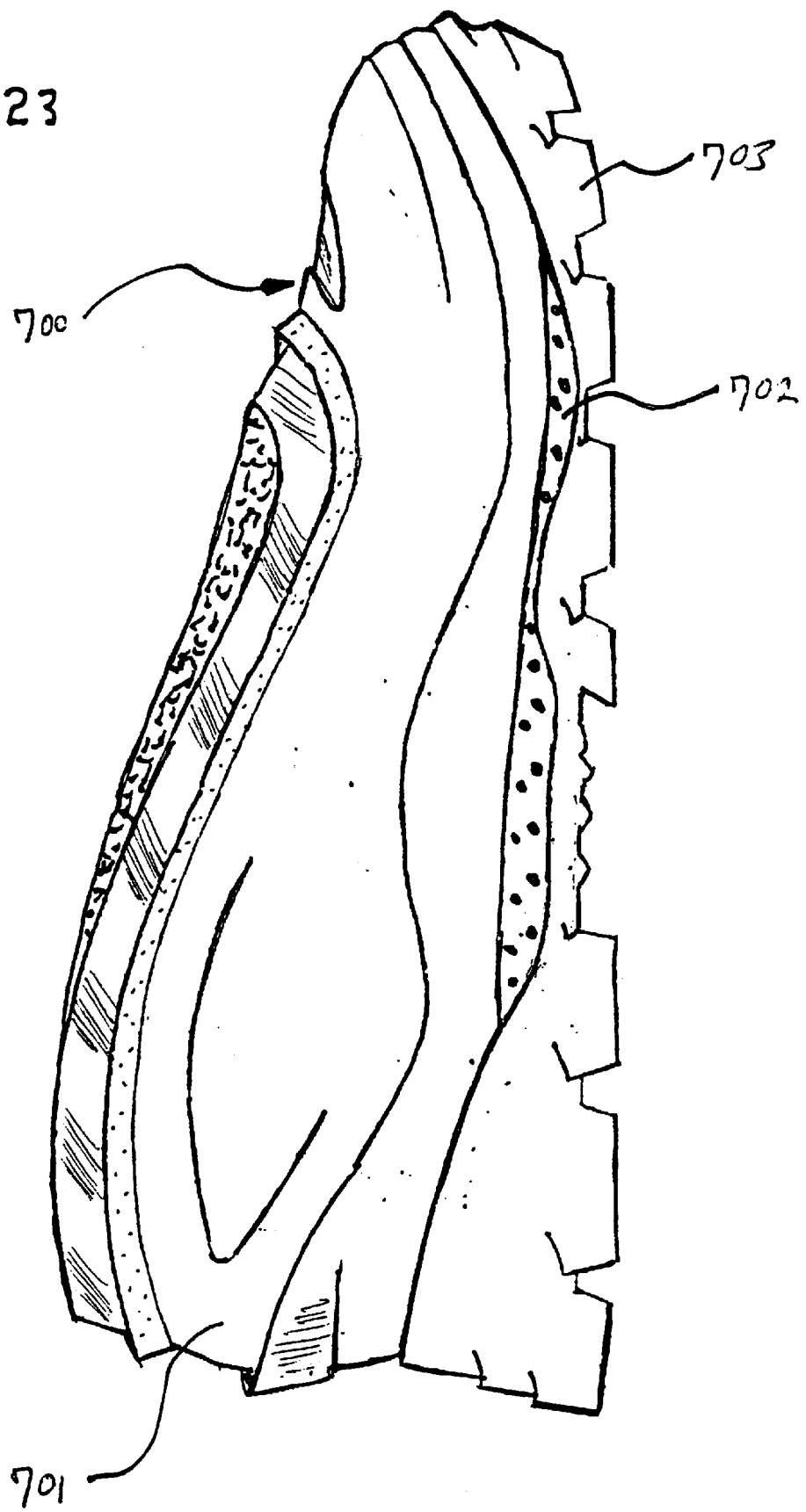
FIG. 23 is a side perspective view of the boot shell of FIG. 21 with an external midsole/wedge, as well as an outersole, attached at the bottom of the shell.

Referring to FIG. 23, boot shell, 701 is mated with external midsole, 702, and attached to outersole, 703 thus forming boot shell assembly, 700.

Figure 24:
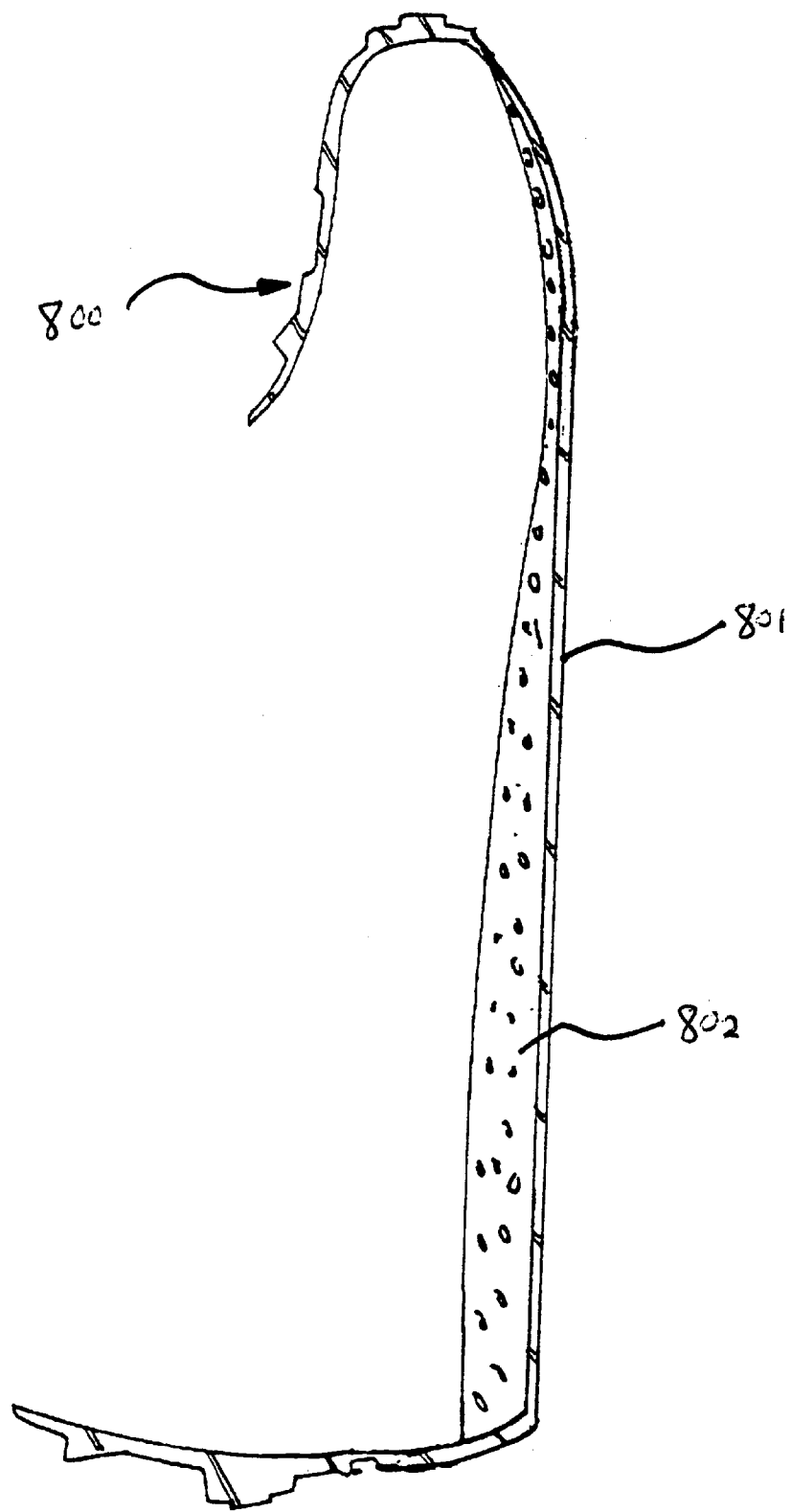
FIG. 24 is a plan cross-sectional view of a boot shell containing an internal midsole/wedge.
Figure 25:
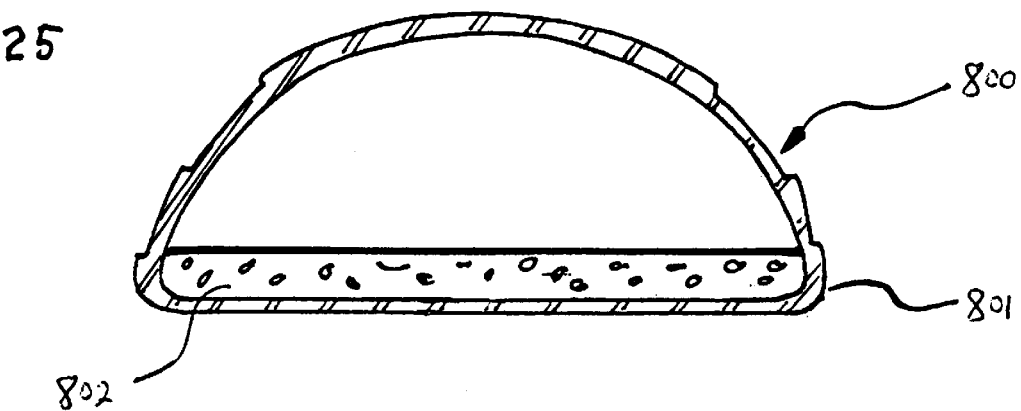
FIGS. 25 and 26 are both cross-sectional views taken through the forefoot and heel areas, respectively, of a boot shell with an internal midsole/wedge.
Figure 26:
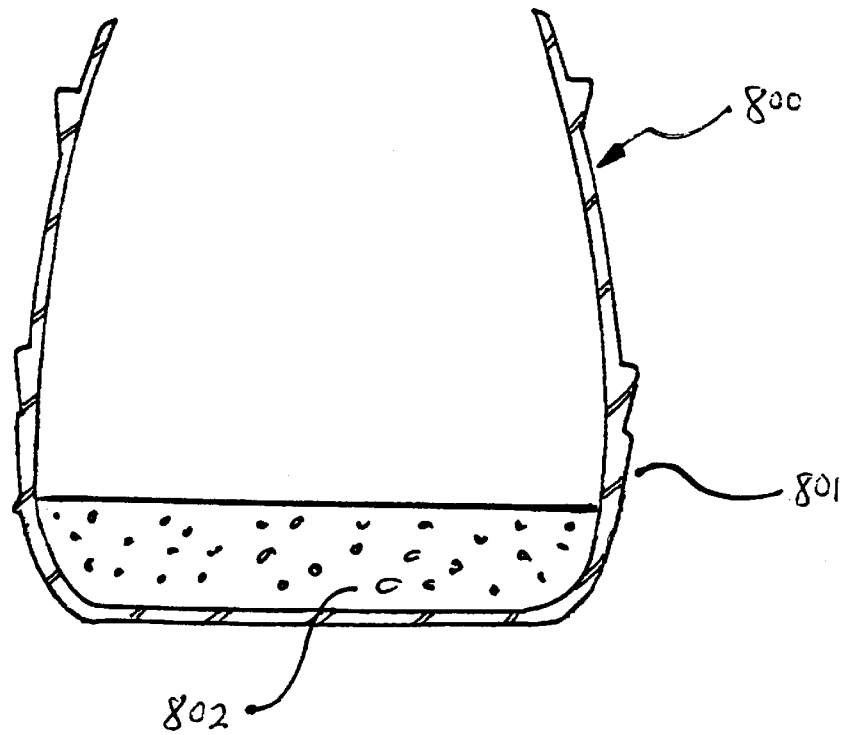

Referring to FIGS. 24, 25, and 26, boot shell, 801 is fitted with internal midsole/wedge unit, 802 forming boot shell assembly, 800.

Figure 27:
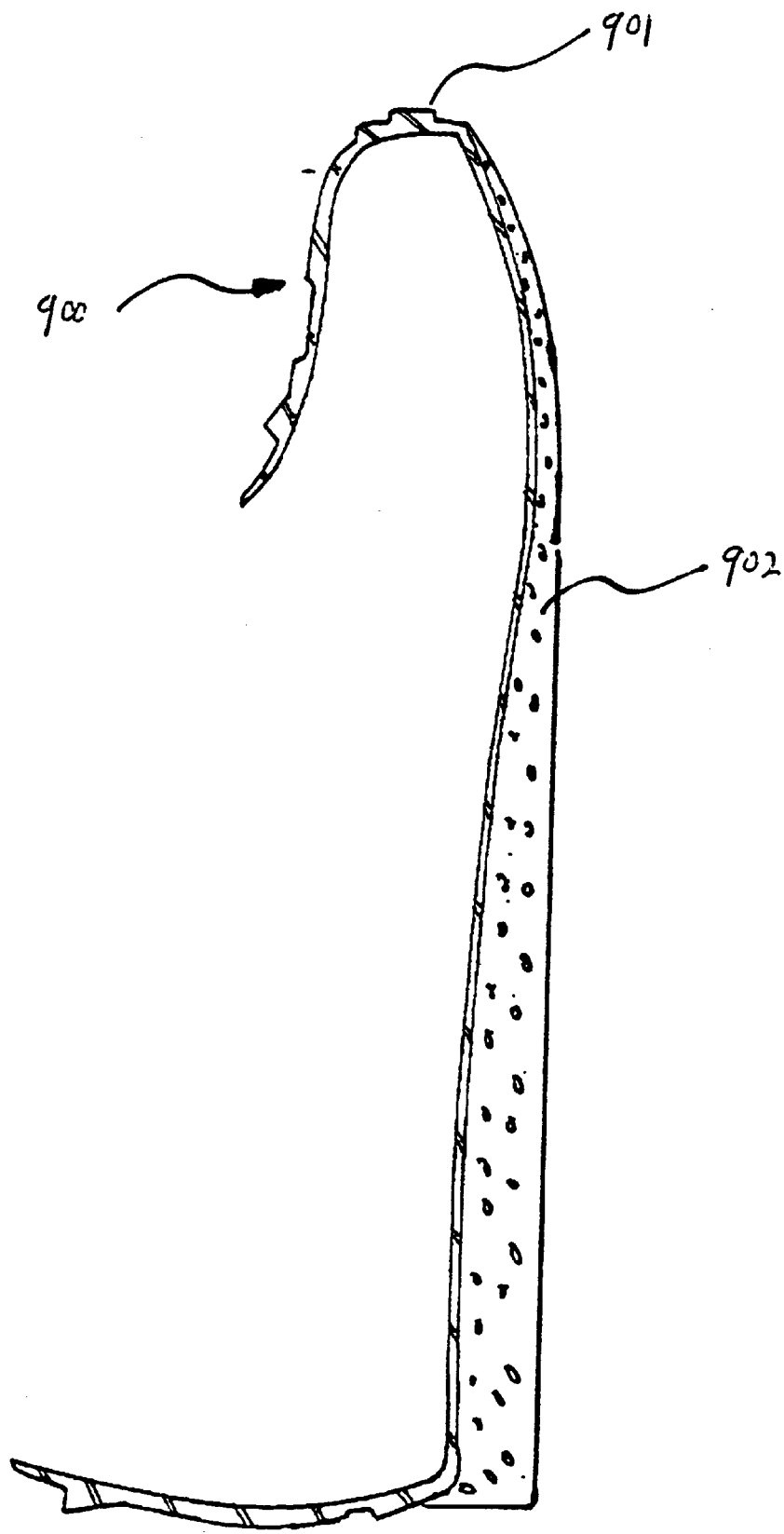
FIG. 27 is a plan cross-sectional view of a boot shell with an external midsole/wedge attached to the shell bottom.
Figure 28:
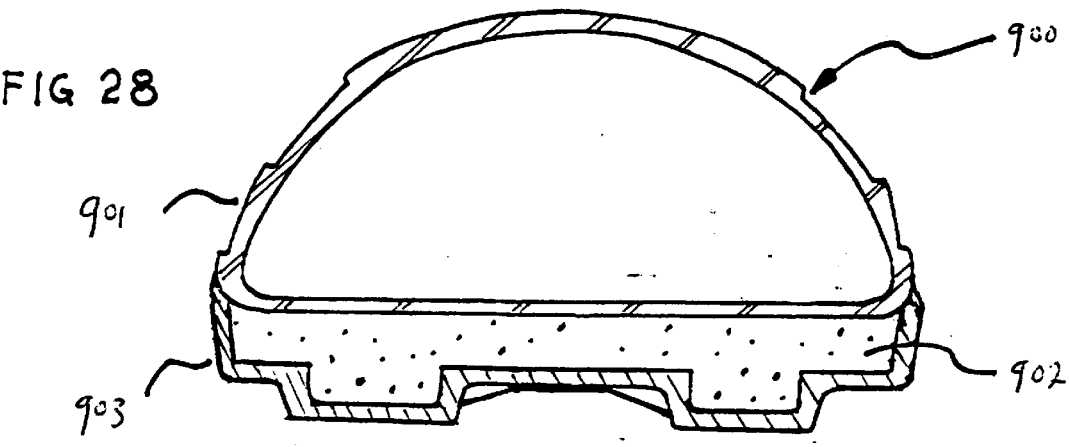
FIGS. 28 and 29 are both cross-sectional views taken through the forefoot and heel areas, respectively, of a boot shell with an external midsole/wedge and an outersole attached to the shell bottom.
Figure 29:
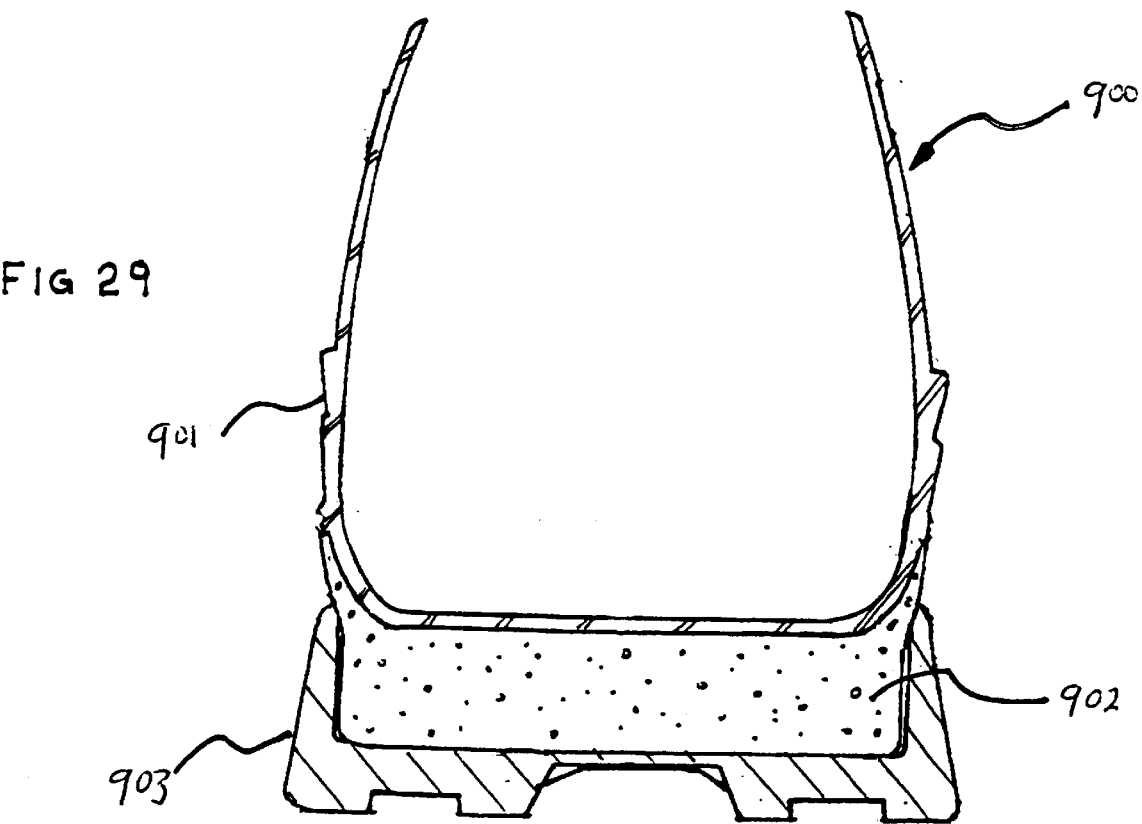

Referring to FIGS. 27, 28, and 29, boot shell, 901 has an attached external midsole/wedge unit, 902 forming boot shell assembly, 900.

Figure 30:
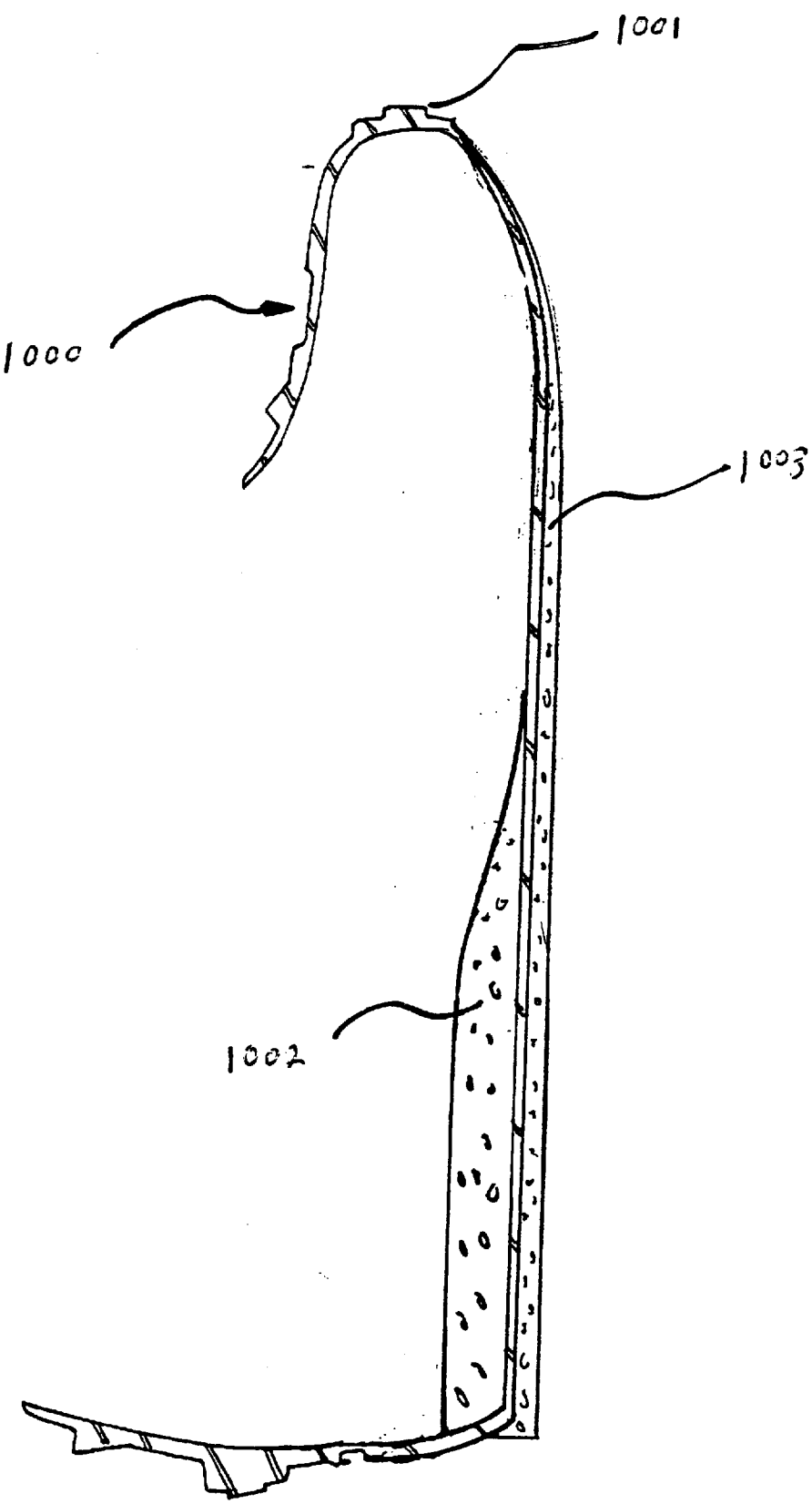
FIG. 30 is a plan cross-sectional view of a boot shell with a split (internal and external) midsole/wedge system.
Figure 31:
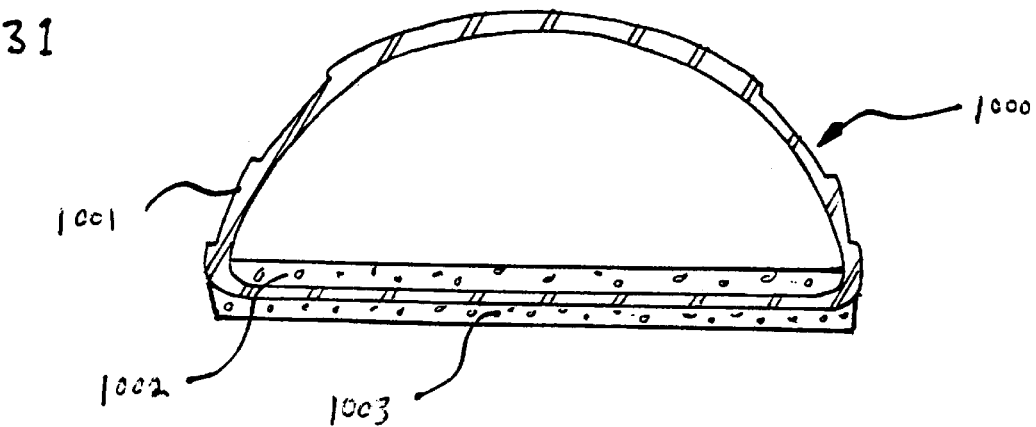
FIGS. 31 and 32 are both cross-sectional views taken through the forefoot and heel areas, respectively, of a boot shell with a split (internal and external) midsole/wedge system.
Figure 32:
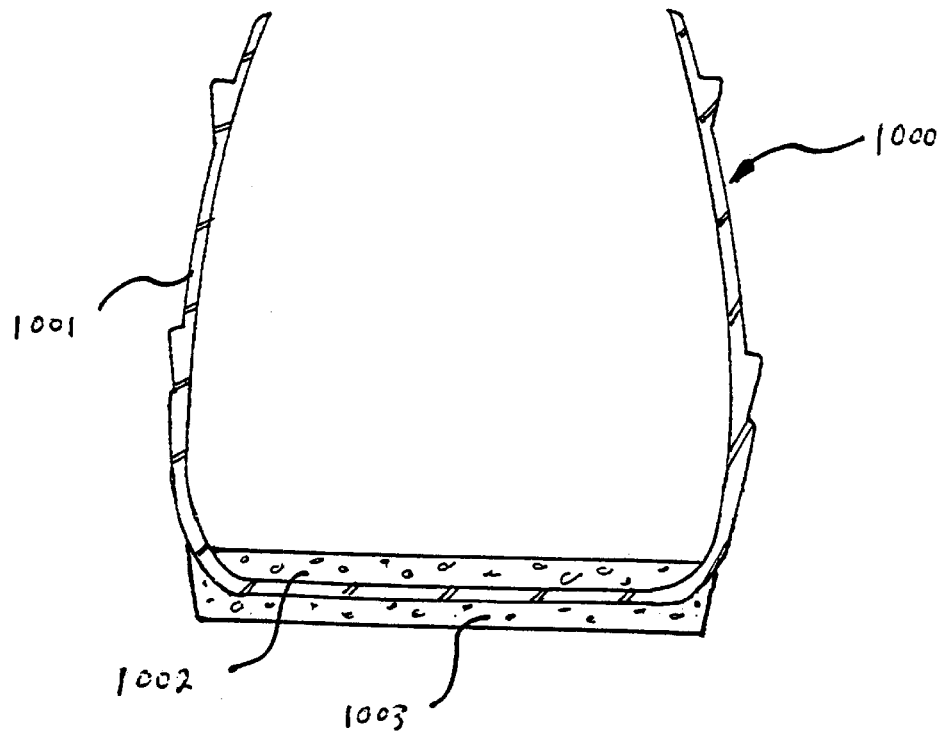

Referring to FIGS. 30, 31, and 32, boot shell, 1001 is fitted with both an internal, 1002 and an external 1003 midsole/wedge system, thus forming boot shell assembly, 1000. As an example, the internal, 1002 material may be more oriented toward thermal insulation, while the external, 1003 material may be more related to cushioning.

Figure 33:
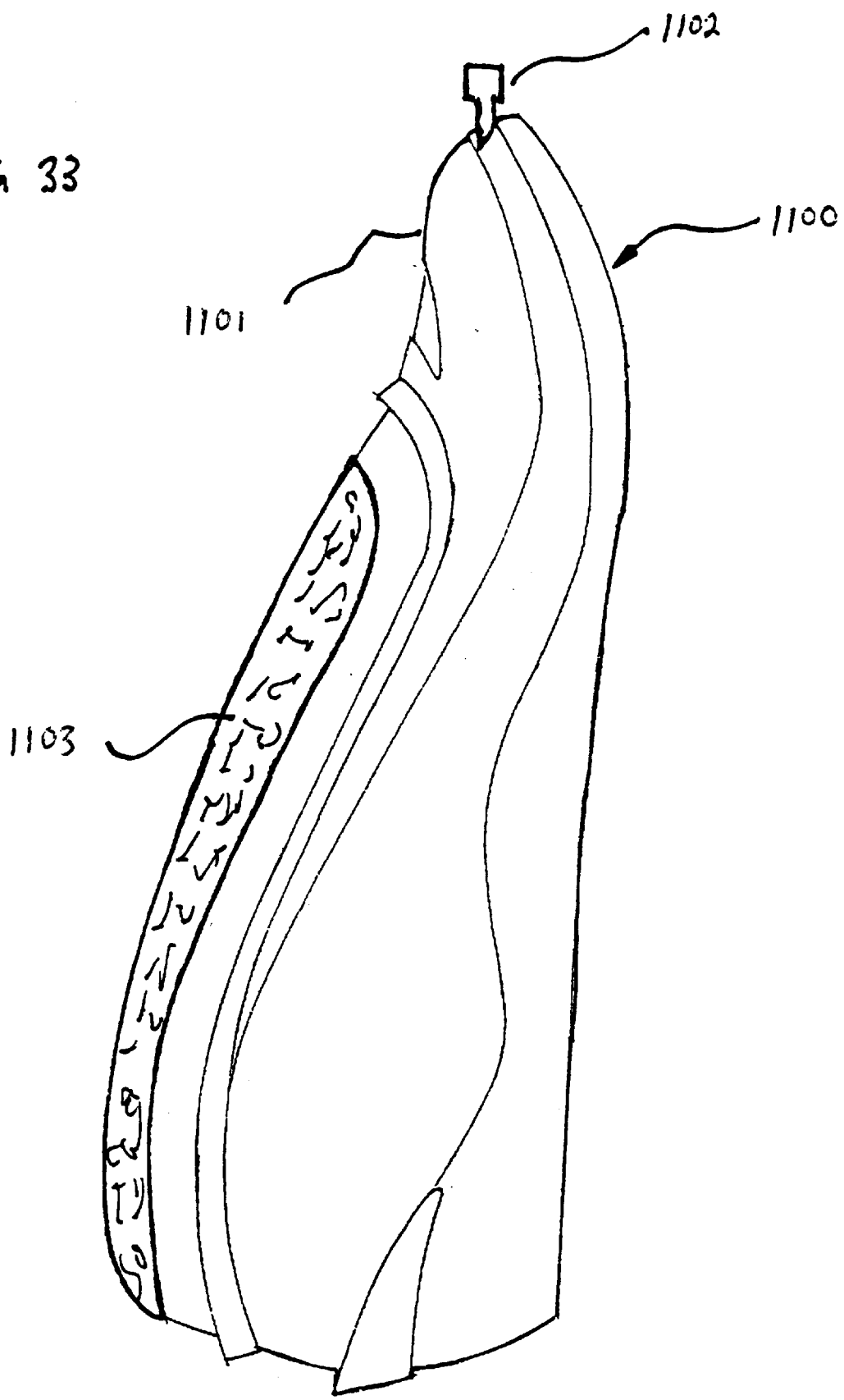
FIG. 33 is a plan perspective view of a boot shell with the flashing at the blow pin and foot entry areas left in the as-molded (untrimmed) mode. This is the configuration used for internally flocking the shell (through the blow pin plastic "funnel" left intact on this view.)

Referring to FIG. 33, untrimmed boot shell assembly, 1100 consists of boot shell (usable,) 1101, blow pin funnel, 1002, and untrimmed foot entry area flashing, 1103. This configuration basically represents a blow molded bottle. It is this configuration that allows internal flocking of textile fibers to the inside surface of the boot shell for control of internal friction within the shell, as previously described.

Referring to FIG. 34, a left boot shell, 1201 and a right boot shell, 1202 are simultaneously formed to create boot shell pair, 1200. After molding and typical flash trimming at the toe and heel areas, the dark trim line, 1203 is cut thus forming a pair of shells. A single parison is used to produce this pair. The mold is designed with the blow pin located at the dark parting line, 1203 at one of the toe/heel areas at the top or bottom of assembly, 1200.

What is claimed is:

1. A method for producing a boot shell comprising:
   providing a mold for a boot, the mold having a mold cavity having at least one mold section, no mold core and a mold opening;
   capturing a parison in the mold cavity, the parison having a varied circumferential thickness; and
   inflating the parison with a pressurized gas injected through the mold opening and an opening of the parison to form a boot shell having an outer surface corresponding to an interior surface of the mold cavity.

2. The method of claim 1 further comprising cooling the boot shell.

3. The method of claim 1 further comprising ejecting the boot shell from the mold.

4. The method of claim 1 further comprising trimming flashing from the boot shell.

5. The method of claim 1 wherein the boot shell is suitable for outdoor use.

6. The method of claim 1 wherein two or more cavity sections are used.

7. The method of claim 1 wherein the parison material is selected from the group of materials consisting of thermoplastics and thermoset materials.

8. The method of claim 1 further comprising placing at least one insert into the mold cavity prior to inflating the parison thereby over-molding the at least one insert into boot shell.

9. The method of claim 8 wherein the insert is selected from the group consisting of tread elements, an outersole, a rigidizing stiffener and a decorative element.

10. The method of claim 1 wherein the mold has a mold cavity shaped to produce both a left and a right boot shell.

11. The method of claim 1 further comprising flocking an inside surface of the boot shell.

12. The method of claim 1 further comprising heating the parison prior to inflating the parison.

13. The method of claim 1 further comprising pinching off an opening of the parison prior to inflating the parison.

14. The method of claim 13 wherein the parison is thermoplastic and the thermoplastic is transparent, translucent, fluorescent, effervescent or iridescent.

15. The method of claim 1 wherein the mold has multiple sections.

16. A method for producing a boot shell comprising:
providing a mold for a boot, the mold having a mold cavity having at least one mold section, no mold core and a mold opening;
capturing a parison in the mold cavity, the parison having a varied vertical thickness; and
inflating the parison with a pressurized gas injected through the mold opening and an opening of the parison to form a boot shell having an outer surface corresponding to an interior surface of the mold cavity.

17. A method for producing a boot shell comprising:
a) providing a boot shell mold that defines a cavity, the mold having a parting line in a tranverse plane and a blow pin receptacle at the front of the mold along the parting line;
b) capturing a plastic parison in the mold such that the parison is pinched off at the rear of the mold, the parison having a thickness that varies across its circumference;
c) pressurizing the captured parison through a blow pin interfaced with the blow pin receptacle such that the parison fills outs the cavity defined by the mold, forming a boot shell; and
d) releasing the boot shell from the mold.

18. A method for producing a boot shell comprising:
a) providing a boot shell mold that defines a cavity, the mold having a parting line in a tranverse plane and a blow pin receptacle at the front of the mold along the parting line;
b) capturing a plastic parison in the mold such that the parison is pinched off at the rear of the mold, the parison having a thickness that varies along its length;
c) pressurizing the captured parison through a blow pin interfaced with the blow pin receptacle such that the parison fills outs the cavity defined by the mold, forming a boot shell; and
d) releasing the boot shell from the mold.

* * * * *

UNITED STATES PATENT AND TRADEMARK OFFICE
CERTIFICATE OF CORRECTION

PATENT NO.   : 6,464,907 B2
DATED         : October 15, 2002
INVENTOR(S)  : Alexander L. Gross It is certified that error appears in the above-identified patent and that said Letters Patent is hereby corrected as shown below:

<u>Title page</u>,
Item [73], delete "Wisconsin Alumni Research Foundation, Madison, WI (US)" as the Assignee.

<u>Column 7</u>,
Line 7, delete "s ide" and replace it with -- side --.
Line 10, delete "shuffle mold" and replace it with -- shuttle mold --.

Signed and Sealed this

Ninth Day of September, 2003

JAMES E. ROGAN
*Director of the United States Patent and Trademark Office*